United States Patent [19]

Brown et al.

[11] Patent Number: 5,492,950
[45] Date of Patent: Feb. 20, 1996

[54] PRESSURE-SENSITIVE ADHESIVES BASED ON EMULSION POLYMERS

[75] Inventors: Ian Brown, Leiderdorp; Stuart A. Harris, Utrecht, both of Netherlands

[73] Assignee: Avery Dennison Corporation, Pasadena, Calif.

[21] Appl. No.: 36,066

[22] Filed: Mar. 23, 1993

[51] Int. Cl.$^6$ .............................. C08J 3/00; C08K 5/41; C08L 31/00
[52] U.S. Cl. ..................... 524/166; 524/156; 524/556
[58] Field of Search ..................... 524/156, 166, 524/556

[56] References Cited

U.S. PATENT DOCUMENTS

| | | | |
|---|---|---|---|
| 4,970,267 | 11/1990 | Bailey et al. | 525/344 |
| 5,221,706 | 6/1993 | Lee et al. | 524/156 |
| 5,236,991 | 8/1993 | Makati et al. | 524/460 |

OTHER PUBLICATIONS

Odian, *Principles of Polymerization*, 1981, p. 113.

*Primary Examiner*—Paul R. Michl
*Assistant Examiner*—Patrick Niland
*Attorney, Agent, or Firm*—Christie, Parker & Hale

[57] ABSTRACT

There is provided a mixture of acrylic emulsion polymers based on 70 to 95 parts by weight of a first polymer containing from about 95 to 97.5% by weight of an alkyl ester of acrylic acid and from about 2.5 to 5% by weight of a mixture of carboxylic acids tackified by a second acrylic emulsion polymer containing 10 to 20% by weight of carboxylic acid or hydroxyethyl methacrylate.

18 Claims, No Drawings

PRESSURE-SENSITIVE ADHESIVES BASED ON EMULSION POLYMERS

FIELD OF THE INVENTION

The present invention relates to pressure sensitive adhesives based on emulsion acrylic polymers in which a first emulsion acrylic polymer is tackified by the addition of a second acrylic emulsion polymer. The pressure sensitive adhesives of the instant invention have excellent adhesion to a wide variety of surfaces.

BACKGROUND OF THE INVENTION

Pressure sensitive adhesives may be based on emulsion polymers. Some emulsion polymers are inherently tacky and function as pressure-sensitive adhesives, while others require tackification to achieve this end. It is desirable in offering a variety of products to provide emulsion polymers which are inherently tacky, but which also accept tackification to enable control in balancing adhesive properties.

It is also desirable for general purpose applications to provide an adhesive which bonds well to substrates of different surface energies over a broad range of end-use temperatures.

Such goals are realized by the practice of the instant invention.

SUMMARY OF THE INVENTION

According to the present invention, there is provided inherently tacky acrylic emulsion adhesive polymers having excellent adhesion to a wide variety of surfaces including polar, relatively high energy surfaces such as stainless steel; nonpolar, relatively low energy surfaces such as polyethylene; and difficult-to-bond surfaces such as corrugated cardboard. In sum, the adhesive polymers are broad-based and serve to replace many solvent-based adhesives on an ecologically safe basis, as well as many emulsion-based adhesives, thus serving a variety of markets.

The emulsion pressure sensitive adhesives of the instant invention are based on a blend of from about 70 to about 95 parts, preferably from about 80 to about 90 parts by weight of a first emulsion polymer which contains, based on the weight of the monomers forming the polymer, about 95 to about 97.5% by weight of at least one alkyl ester of acrylic acid containing from about 4 to about 10 carbon atoms in the alkyl group, preferably butyl acrylate, 2-ethyl hexyl acrylate and mixtures thereof, and from about 2.5 to about 5% of at least one and preferably a mixture of unsaturated carboxylic acids containing from 3 to about 5 carbon atoms, most preferably a mixture of acrylic and methacrylic acids in respective weight ratios of about 1:1 to about 1:3, preferably about 1:1 to about 1:2, the emulsion polymer having a glass transition temperature of less than about −10° C., and a gel content greater than about 50% by weight of the polymer. The first emulsion adhesive polymers may be provided in admixture with an anionic surfactant system. One such system comprises, based on the weight of surfactants and first emulsion polymer, of from about 1% to 2% by weight of a sodium alkyl ether sulfate, about 0.1% to about 0.2% by weight of a sodium di-alkyl sulfosuccinate, and/or about 0.15% to 0.3% by weight of a disodium ethoxylated alkyl alcohol half ester of sulfosuccinic acid.

The first emulsion polymer with or without surfactants is combined with about 5 to about 30 parts preferably from about 10 to about 20 parts of a second emulsion polymer which serves to tackify the first emulsion polymer and as part of a blend, improves lay flatness, adhesion to a variety of surfaces and shear. The presently preferred second emulsion polymer is an acrylic emulsion polymer containing from about 10 to about 20 percent by weight of a compound selected from the group consisting of unsaturated carboxylic acids containing from about 3 to about 5 carbon atoms and hydroxyethyl methacrylate. The balance of the polymer contains from about 55 to about 90% by weight acrylates containing from 4 to about 8 carbon atoms in the alkyl group, from 0 to about 15% by weight vinyl acetate and 0 to about 15% by weight methyl acrylate. The second emulsion polymer is preferably formed in the presence of a chain transfer agent preferably n-dodecyl mercaptan and from 0 to 5 percent by weight of an external or an internal cross linker such as aluminum acetate.

While the mixture of polymer may be used as such, the mixture may be further tackified by the inclusion of dispersible tackifiers, such as rosin or tall oil based tackifiers.

DETAILED DESCRIPTION

The present invention relates to pressure sensitive adhesive compositions based on a blend of emulsion pressure sensitive adhesive polymers which provide high adhesion to polar, nonpolar, and difficult-to-bond substrates with excellent shear properties. The adhesives moreover exhibit excellent adhesion to skin and wet surface as well as tolerance for silicone contamination. The polymers are prepared by emulsion polymerization and may be used with an anionic surfactant system. The pressure sensitive adhesive are all based on a blend of emulsion polymers the first, a base polymer, and the second, a polymer which acts to tackify the base polymer.

The pressure sensitive adhesives of the instant invention can be adapted to be used on almost any available face stock or backing and provide excellent coating and lay flat properties.

The emulsifier acrylic pressure sensitive adhesives which do not give good adhesion to nonpolar surfaces such as polyolefins and other difficult-to-bond surfaces such as recycled corrugated cardboard. As such, the adhesives are most universal in their use, including high speed convertibility in label manufacture.

The emulsion based pressure sensitive adhesives of the instant invention are based on a first emulsion polymer which contains, on a percent by weight basis, from about 95% to about 97.5% by weight total of at least one alkyl ester of acrylic acid containing about 1 to about 10 carbon atoms in the alkyl group. Useful alkyl acrylates include n-butyl acrylate, 2-ethyl hexyl acrylate, isooctyl acrylate and the like. Butyl acrylate, 2-ethyl hexyl acrylate and mixtures thereof are preferred. Butyl acrylate is most preferred.

The second monomeric component is a one or more $\alpha,\beta$ unsaturated carboxylic acid present in a total amount of, at least about 2.5% by weight, preferably from about 2.5 to about 5% by weight.

The unsaturated carboxylic acid may contain from about 3 to about 5 carbon atoms and includes among others, acrylic acid, methacrylic acid, itaconic acid and the like. Mixtures of acrylic acid and methacrylic acid in a respective weight ratio of about 1:1 to about 1:3, preferably from about 1:1 to about 1:2 are preferred.

Gel content or percent insolubles of the polymer are at least about 50% by weight and typically range from about 50% to about 65% by weight which provides excellent cohesive strength without internal cross-linking or the use of multifunctional monomers. In this regard, gel represents the amount of polymer which is insoluble in tetrahydrofuran expressed in percent by weight and determined by the membrane gel partitioning method. In this method, about 600 to 800 milligrams of 100% solid polymer is weighed onto a millipore membrane disk of 5 micrometer porosity. The disk is heat sealed and transferred to a scintillation vial. About 20 milliliters of tetrahydrofuran are added to the vial and the vial is rotated on a shaker for 16 to 24 hours. The sealed disk is then removed, washed with tetrahydrofuran, and dried first by placing it on a Whatman No. 1 filter paper, followed by exposure to 100° C. in the oven for a few hours. The dried disk is weighed and the insoluble portion of the polymer determined by the equation:

$$\text{Per cent insoluble} = \frac{(b-c)}{a} \times 100 = \% \text{ gel}$$

wherein
a=total weight of 100% solids polymer
b=the weight of the polymer plus membrane before tetrahydrofuran treatment
c=polymer plus membrane remaining after tetrahydrofuran treatment.

The emulsion polymers have a glass transition temperature less than about −10° C., preferably less than about −30° C., and give, when combined with the anionic surfactant system, a good balance of adhesive properties at ambient and low temperatures. Properties are modified by tackification.

The first emulsion polymers of the instant invention are prepared by emulsion polymerization under conditions of agitation in an autogenous atmosphere in the presence of suitable polymerization initiators such as water soluble persulfates. Chain transfer agents such as alkyl mercaptans can be employed. Electrolytes can be used to stabilize the emulsion. Solids content will vary depending upon the selected polymerization conditions. Polymerization conditions are desirably chosen to maintain grit levels low. Polymerization typically occurs under acid conditions and the emulsion formed is neutralized typically with ammonia to a final pH of from about 6 to about 6.5.

Polymers of the instant invention can be produced at a high solids level, at temperatures from 70° C. to 85° C., with use of an initial batch of monomers followed by addition of the balance of the monomers being added to the emulsion reaction system over a period of time.

The emulsion polymers are utilized and preferably formed in the presence of an anionic surfactant system present in an amount of from up to about 2.5% by weight based on the weight of the monomers and anionic surfactant system.

The principle anionic surfactant is present in a total amount of from about 1% to about 2% by weight of the mixture and is a sodium alkyl ether sulfate of the formula:

$$CH_3-(CH_2)-{_n}CH_2O(CH_2CH_2O)_x\,SO_3Na$$

wherein n represents the number of —(CH$_2$)— groups normally in the range of about 6 to about 12 and x represents the number of repeating ethoxy groups normally in the range of 2 to about 30, preferably about 20 to about 30. The principal anionic surfactant may be used in admixture with from about 0.1 to about 0.2% by weight of sodium dialkyl sulfosuccinate of the formula:

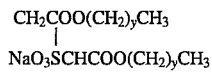
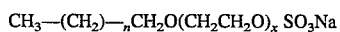

wherein y is independently the number of repeating —(CH$_2$)— groups in each alkyl group, typically in the range of about 6 to about 18, preferably about 7, and the like. A third anionic surfactant may be present in an amount of from 0.2 to about 0.3% by weight and is a disodium ethoxylated alkyl alcohol half ester of an sulfosuccinic acid in which the alkyl group contains from about 10 to about 12 carbon atoms and the like.

The first emulsion polymer alone or with surfactant is tackified with a second acrylic emulsion polymer which may independently be a pressure sensitive adhesive. The presently preferred acrylic emulsion polymer tackifiers are polymers containing about 10% to 20% by weight of a compound selected from the group consisting of α,β unsaturated carboxylic acids and hydroxyethyl methacrylate. Other tackifiers such as rosin esters and tall oil esters may also be used.

The second or tackifying pressure-sensitive adhesive polymer useful in the instant invention are prepared by batch (single stage) or sequential polymerization or by blending of batch polymers. Glass transition temperature as measured by DSC (Differential Scanning Calorimetry) of the final polymer or blend of polymers is in the range from about −15° C. to −50° C. Molecular weight of some amount of the polymer may be limited by utilizing as the adhesive polymer or a component of a polymer blend, an adhesive polymer formed in the presence of a chain transfer agent, preferably n-dodecyl mercaptan, at a concentration providing a net polymer blend having a good balance of dispersibility, humidity resistance and a resistance to bleed.

The second or tackifying pressure-sensitive adhesive polymers of the instant invention contain, on a percent by weight basis, from about 55 to about 90% by weight total of one or more alkyl acrylates containing from 4 to about 8 carbon atoms in the alkyl group. Useful alkyl acrylates include n-butyl acrylate, 2-ethyl hexyl acrylate, isooctyl acrylate, and the like, as well as mixtures thereof.

Other modifying monomers may be effectively employed so long as the glass transition temperature of the final adhesive remains in the range of from about −15° C. to −50° C. Representative modifying monomers include lower alkyl acrylate such as a methyl acrylate; vinyl esters, such as vinyl acetate, vinyl butyrate, vinyl propionate, vinyl isobutyrate, vinyl valerate, vinyl versitate, and the like; and diesters of an unsaturated dicarboxylic acid and mixtures thereof, such as di-2-ethyl hexyl maleate, di-2-ethyl hexyl fumarate, and dibutyl fumarate and the like.

When employed, vinyl acetate and methyl acrylate improve the hydrophilic characteristic of the polymers, with methyl acrylate further acting to improve cohesive strength. Vinyl acetate and methyl acrylate are each employed in a concentration of 0 to 15% by weight, and preferably in equal amounts.

Other preferred acrylate monomer combinations system employ a mixture of 2-ethyl hexyl acrylate and butyl acrylate with the preferred ratio of 2-ethyl hexyl acrylate to butyl acrylate being about 3 to 1.

The essential component of the repulpable polymers is a compound selected from the group consisting of α,β unsaturated carboxylic acids containing from 3 to about 5 carbon atoms and hydroxyethyl methacrylate present in the amount of from about 10 to about 20% by weight of the monomer. A blend of acrylic acid with at least one unsaturated oleophilic carboxylic acid, such as methacrylic acid and itaconic acid and the like, with a ratio of acrylic acid to oleophilic acid being from about 2:3 to about 7:1 is preferred. Blends of acrylic acid and methacrylic acid are in which acrylic acid is present in a concentration of about 5 to about 19% by weight of the polymer and methacrylic acid is present in a concentration of about 1 to about 15% weight of the polymer are most preferred.

By the term "oleophilic" carboxylic acid as used herein there is meant unsaturated carboxylic acids which are more soluble in the monomeric oil phase of the emulsion than acrylic acid.

In all emulsion polymerization systems, monomers homopolymerize and copolymerize. We have found that an oleophilic unsaturated carboxylic acid, such as methacrylic acid, is not only preferentially soluble in and copolymerizes with alkyl acrylates, but enhances the solubility of acrylic acid in such monomers to promote copolymerization of acrylic acid with the alkyl acrylates.

When employed, butyl acrylate adds stiffness to the copolymer, methacrylic acid promotes acrylic acid copolymerization, and acrylic acid enhances adhesion to polar surfaces.

All or a portion of the emulsion pressure-sensitive adhesive polymers used in the instant invention are prepared in the presence of a chain transfer agent present in an amount of from about 0.5 to about 1.5% by weight of the monomers, preferably from about 0.75% to about 1.25% by weight of the monomers. The preferred chain transfer agent is n-dodecyl mercaptan or t-dodecyl mercaptan.

The tackifying emulsion pressure-sensitive adhesive polymers are prepared by providing an initial charge to a polymerization reactor of an aqueous solution containing a nonionic surfactant which is preferably an ethoxylated rosin acid emulsifier, most preferably an ethoxylated rosin acid emulsifier. There is added to the initial charge in the reactor a small amount of the monomers separately prepared in a pre-emulsion containing anionic surfactant, preferably a sulfated ethoxylated nonylphenol and a free radical initiation system. The presently preferred nonionic surfactant is AR-150 manufactured and sold by Hercules. The presently preferred anionic surfactant is Alipal CO-436 manufactured by Rhone Poulenc. The amount of nonionic surfactant employed may be from about 4 to about 8% by weight of the initial reactor charge, with anionic surfactant concentration being from about 2.5% to about 5% by weight of the monomers in the pre-emulsion.

The reaction is redox initiated and the remaining pre-emulsified monomers are added incrementally, i.e., intermittently or continuously over a period of time.

While, as previously indicated, the monomers can be added in one pre-emulsion charge, it is preferred that the monomers be sequentially added. It is presently preferred that from about 40 to about 80% of the total monomers be incrementally added to the initial charge and essentially totally reacted following by the incremental addition of the remainder of the monomers in a second pre-emulsion for reaction in the reactor. Excellent results have been obtained in sequential polymerization where the first charge of monomers contains about 15 to 20% by weight carboxylic acid, or hydroxyethyl methacrylate and the second charge of monomers contains about 10 to 25% by weight carboxylic acid or by dioxy ethyl methacrylate.

To achieve a highly useful product, the pressure sensitive adhesives of the present invention contain from about 70 to about 95 preferably from about 80 to about 90% by weight of the first emulsion polymer and from about 5 to about 30 preferably from about 10 to about 20% by weight of the second or tackifying emulsion polymer.

While nowise limiting, the following exemplify the properties of the emulsion adhesives of this invention.

EXAMPLES 1 TO 4

There was formed by emulsion polymerization first emulsified polymer containing, on an interpolymerized basis, about 97% by weight butyl acrylate, 1.2% by weight acrylic acid and 1.8% by weight methacrylic acid. The emulsion contained about 0.12 part by weight of an anionic sodium dioctyl sulfosuccinate, 0.24 part by weight of an anionic disodium ethoxylated alcohol [$C_{10}$–$C_{12}$] half ester of sulfosuccinic acid, and 1.5 parts by weight anionic ethoxylated lauryl alcohol sodium sulfate containing about 25 ethylene oxide units per molecule per 100 parts by weight polymer. This formed a first emulsion polymer ("Polymer A") which was utilized in the Examples.

The second emulsion polymer ("Polymer B") was formed by forming as a base in a reaction the composition shown in Table I.

TABLE I

| Component | Grams |
| --- | --- |
| WATER | 150 |
| AR-150[1] | 40 |
| Fe EDTA[2] | 0.1 |

[1] AR150—A nonionic ethoxylated rosin acid emulsifier manufactured by Hercules.
[2] Fe EDTA—Ferric salt of ethylenediaminetetraacetic acid.

[1] AR150—A nonionic ethoxylated rosin acid emulsifier manufactured by Hercules.
[2] Fe EDTA—Ferric salt of ethylenediaminetetraacetic acid.

The mixture was heated to 70° C. and treated with hydrogen peroxide for one half hour, then allowed to cool to 50° C. at which time there was added 3 grams $K_2S_2O_8$ and 9 grams of $NaHCO_3$.

There was separately formed, a pre-emulsion of the composition shown in Table II.

TABLE II

| Ingredient | % Monomers | Grams |
| --- | --- | --- |
| Water | | 255 |
| Alipal CO-436 (60%)[3] | | 40 |
| $K_2S_2O_8$ | | 2.4 |
| 2-Ethyl Hexyl Acrylate (2 EHA) | 61 | 384 |
| Butyl Acrylate (BA) | 20.3 | 128 |
| Methacrylic Acid (MAA) | 12.2 | 76.8 |
| Acrylic Acid (AA) | 6.5 | 41.2 |
| Catalyst, tetiarybutylhydroperoxide (t-BHP) | | 7.2 |
| Chain transfer agent, n-dodecyl mercaptan (n-DDM) | | |

[3] Alipal C0436—A sulfurated ethoxylated nonylphenol containing 6 units of ethylene oxide per molecule acid manufactured and sold by Rhone Poulenc.

[3] Alipal C0436—A sulfurated ethoxylated nonylphenol containing 6 units of ethylene oxide per molecule acid manufactured and sold by Rhone Poulenc.

There is also formed a second pre-emulsion of the composition shown in Table III.

TABLE III

| Ingredient | % Monomers | Grams |
| --- | --- | --- |
| Water | | 75 |
| Alipal CO-436 (60%) | | 10 |

TABLE III-continued

| Ingredient | % Monomers | Grams |
| --- | --- | --- |
| $K_2S_2O_8$ | | 0.6 |
| 2EHA | 58.2 | 96 |
| BA | 29.1 | 48 |
| MAA | 8.8 | 14.6 |
| AA | 3.9 | 6.4 |
| t-BHP | | 0.6 |
| n-DDM | | 1.8 |

50 grams of the first pre-emulsion was charged to the reactor at 50° C. and the balance incrementally added over a two hour period. Following completion of addition of the first pre-emulsion there was started the incremental addition of the second pre-emulsion over a one hour period.

Table IV shows the adhesive properties of blends of the first polymer (Polymer A) and second tackifying emulsive polymer (Polymer B) according to standard test methods.

TABLE IV

| Example | 1 | 2 | 3 | 4 |
| --- | --- | --- | --- | --- |
| Polymer A % | 70 | 80 | 90 | 95 |
| Polymer B % | 30 | 20 | 10 | 5 |
| Coat Weight 9/m² | 18.3 | 17.1 | 17.2 | 17.0 |
| Backing | Vellum | Vellum | Vellum | Vellum |
| Release paper | Hygroflat 80 | Hygroflat 80 | Hygroflat 80 | Hygroflat 80 |
| Silicone system | Wacker 922 15% CRA | Wacker 922 15% CRA | Wacker 922 15% CRA | Wacker 922 15% CRA |
| Adhesive oven temperature | 60° C. | 60° C. | 60° C. | 60° C. |
| Shear (min), RT | 95 | 141 | 225 | 317 |
| RT tack, N/25 mm | | | | |
| PE Tack | 5.3 | 6.2 | 6.2 | 6.4 |
| Glass Tack | 17.8 | 16.8 | 17.6 | 15.8 |
| Card Tack | 8.8 | 8.7 | 7.8 | 8.1 |
| 90° Peel, N/25 mm | | | | |
| Stainless steel | 14.0 | 11.2 | 9.6 | 7.2 |
| Glass | 9.4 | 7.9 | 7.3 | 6.1 |
| HDPE | 4.7 | 4.4 | 4.3 | 4.2 |
| Brown Cardboard | 5.6 | 5.3 | 6.0 | 5.4 |
| Half/half Cardboard | 8.0 | 7.0 | 6.5 | 5.6 |
| Recycled Cardboard | 2.1 | 2.1 | 2.2 | 1.9 |
| 5% Tack, N/25 mm | | | | |
| PE Tack | 5.8 | 6.3 | 6.7 | 8.2 |
| (int) | 58 | 111 | 141 | 161 |
| Card Tack | 3.5 | 5.7 | 5.7 | 6.0 |
| (int) | 114 | 167 | 138 | 167 |
| Mandrel/24 hrs | <<0.25 | <<0.25 | <<0.00 | <<0.00 |
| HDPE | <<0.25 | <<0.25 | <<0.25 | <<0.25 |

RT = Room Temperature
PE = Polyethylene
Card = Cardboard
HDPE = High Density Polyethylene It was clearly seen from the data that as the percentage of the tackifying polymer was decreased, there was a marked increase in the shear performance.

The room temperature polyethylene tack showed a jerky peel/slight jerky peel mode of failure up to the ratio of 80/20, where a flow peel mode of failure was then seen.

The room temperature glass tack showed a very aggressive paper tear mode of failure up to the 90/10 ratio. At a 5% level of tackifying polymer, an increase of 3.0 N/25 mm² was seen when compared to the pure untackified first polymer construction.

The room temperature cardboard tack gave a very aggressive and destructive fiber tear mode of failure up to the 90/10 ratio, where a fiber pluck mode of failure was then seen.

For the 90° Stainless steel adhesion a paper tear mode of failure was seen up to the 95/5 polymer ratio, whereas the 90° Glass gave a paper tear mode of failure up to the 90/10 ratio.

The 90° HDPE adhesion showed a flow peel mode of failure for all adhesive formulations.

On all the 90° adhesions on the Brown, and the Half/half cardboard substrates, a fiber tear destructive mode of failure was seen.

The 90° adhesion on the recycled cardboard showed a severe fiber pluck mode of failure for all of the analyzed adhesive formulations.

The +5° C. polyethylene tack gave a flow peel mode of failure at a 80/20 ratio. At the 70/30 and above a jerky peel mode of failure was seen.

At +5° C. cardboard tack a higher level of aggression was seen, as the percentage of the first polymer was increased. For all the analyzed adhesives a similar type of fiber damage to the test substrate was seen.

The mandrel on both Glass and HDPE were of a similar level, i.e., all showed a good level of performance.

From the enclosed data the best balanced adhesive performance was seen from the 80/20 and the 90/10 polymer ratios gave a very good overall performance level, showing a very aggressive/destructive behavior on the Steel, Glass and all the Cardboard substrates analyzed. The level of aggression onto the HDPE was not as high as the S2010, but at 23° C. and +5° C. gave a flow peel mode of failure.

The static shear for the 80/20 and the 90/10 polymer ratio were much higher than the S2010.

The oven temperature for the pure polymer formulations were run at 60° C. compared to 90° C. for other emulsion polymer, a drop in oven temperatures of 30° C.

What is claimed is:

1. A pressure-sensitive adhesive comprising:
   (a) from about 70 to about 95% by weight of total polymers of a first emulsion polymer having a glass transition temperature less than about −10° C. and a gel content greater than about 50% by weight and formed of at least one alkyl ester of acrylic acid containing from 1 to about 10 carbon atoms in the alkyl group, the total of alkyl ester present in an amount from about 95 to about 97.5% by weight of the polymer, and a mixture of α,β ethylenically unsaturated carboxylic acids present in a total amount of from about 2.5 to about 5% by weight of the polymer; and
   (b) from about 30 to about 5% by weight of total polymers of a second tackifying emulsion polymer formed from about 55 to 90% by weight of at least one alkyl acrylate containing from 4 to about 8 carbon atoms in the alkyl group, from 10 to about 20% by weight of a compound selected from the group unsaturated carboxylic acids, and hydroxy ethyl methacrylate, from 0 to about 15% by weight of at least one vinyl ester, and from 0 to about 15% by weight methyl acrylate, said mixture of said first emulsion polymer and said second tackifying emulsion polymer having a glass transition temperature of about −15° to about −50° C., said second tackifying emulsion polymer formed in the presence of anionic and nonionic surfactants, and a chain transfer agent.

2. A pressure-sensitive adhesive emulsion as claimed in claim 1 in which the alkyl ester of acrylic acid is of the first emulsion polymer selected from the group consisting of 2-ethyl hexyl acrylate, butyl acrylate and mixtures thereof.

3. A pressure-sensitive adhesive emulsion as claimed in claim 1 in which the mixture of ethylenically unsaturated acids of the first emulsion polymer is a mixture of acrylic acid and methacrylic acid provided at a weight ratio of acrylic acid to methacrylic acid of about 1:1 to about 1:3.

4. A pressure-sensitive adhesive emulsion as claimed in claim 2 where the mixture of ethylenically unsaturated acid of the first emulsion polymer is a mixture of acrylic acid and methacrylic acid provided at a weight ratio of acrylic acid to methacrylic acid of about 1:1 to about 1:2.

5. A pressure-sensitive adhesive as claimed in claim 1 in which the alkyl acrylate of the second tackifying emulsion polymer is a mixture of butyl acrylate with a second alkyl acrylate selected from the group consisting of 2-ethyl hexyl acrylate, isooctyl acrylate and mixtures thereof.

6. A pressure-sensitive adhesive as claimed in claim 5 in which the weight ratio of the second acrylate to butyl acrylate is about 3 to 1.

7. A pressure-sensitive adhesive emulsion as claimed in claim 1 in which the carboxylic acid is a blend of acrylic acid and methacrylic acid.

8. A pressure-sensitive adhesive as claimed in claim 1 in which there is present an anionic surfactant system in an amount based on the weight of the first emulsion polymer and anionic surfactants of:
   i. from about 1 to about 2% by weight, a sodium alkyl ether sulfate of the formula:

$$CH_2-(CH_2)_n-CH_2O(CH_2CH_2O)_x SO_3Na$$

wherein n is from about 6 to about 12 and x is from about 2 to about 30, ii. from about 0.15 to about 0.3% by weight, and disodium ethoxylated alkyl alcohol half ester of sulfosuccinic acid, and
   iii. from about 0.1 to about 0.2% by weight of sodium dialkyl sulfosuccinate of the formula:

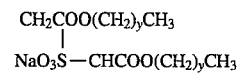

wherein y is the number of repeating —(CH$_2$)— groups in the alkyl groups.

9. A pressure-sensitive adhesive emulsion as claimed in claim 1 in which the alkyl ester of acrylic acid of the first emulsion polymer is selected from the group consisting of 2-ethyl hexyl acrylate, butyl acrylate and mixtures thereof.

10. A pressure-sensitive adhesive emulsion as claimed in claim 1 where the mixture of ethylenically unsaturated acids of the first emulsion polymer is a mixture of acrylic acid and methacrylic acid provided at a weight ratio of acrylic acid to methacrylic of about 1:1 to about 1:3.

11. A pressure-sensitive adhesive comprising:
   (a) from about 80 to about 90% by weight of total polymers of a first emulsion polymer having a glass transition temperature less than about −10° C. and a gel content greater than about 50% by weight and comprising:
      i. at least one alkyl ester of acrylic acid containing from 1 to about 10 carbon atoms in the alkyl group, the total alkyl ester present in a total amount of from about 95 to about 97.5% by weight of the polymer, and
      ii. a mixture of acrylic acid and methacrylic acid present in a total amount of from about 2.5% to about 5% by weight of the first polymer and wherein the weight ratio of acrylic acid to methacrylic acid is from about 1:1 to about 1:3;
   b. an anionic surfactant system comprising, based on the weight of the anionic surfactant system and the first polymer:
      i. from about 1% to about 2% by weight of a sodium alkyl ether sulfate of the formula:

wherein N is from 6 to about 12 and x is from 20 to about 30,
      ii. from about 0.15 to about 0.3% by weight, disodium ethoxylated alkyl alcohol half ester of sulfosuccinic acid wherein the alkyl group contains from 10–12 carbon atoms, and
      iii. from about 0.1 to about 0.2% by weight, of a sodium dialkyl sulfosuccinate of the formula:

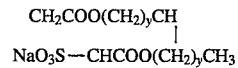

wherein each Y is independently from about 6 to about 18; and
   (c) from about 20 to about 10% by weight of total polymers of a second tackifying emulsion polymer formed from about 55 to 90% by weight of a first monomer which is at least one alkyl acrylate containing from 4 to about 8 carbon atoms in the alkyl group, from 10 to about 20% by weight of a compound selected from the group unsaturated carboxylic acids, and hydroxy ethyl methacrylate, from 0 to about 15% by weight of at least one vinyl ester, and from 0% to about 15% by weight methyl acrylate, said mixture of emulsion polymer and said second tackifying polymer having a glass transition temperature of about −15° to about −50° C., said second tackifying emulsion polymer formed in the presence of anionic and nonionic surfactants, and a chain transfer agent.

12. A pressure-sensitive adhesive emulsion as claimed in claim 11 in which the alkyl ester of acrylic acid is selected from the group consisting of 2-ethyl hexyl acrylate, butyl acrylate and mixtures thereof.

13. A pressure-sensitive adhesive emulsion as claimed in claim 11 where the weight ratio of acrylic acid to methacrylic acid is from about 1:1 to about 1:2.

14. A pressure-sensitive adhesive as claimed in claim 11 in which the alkyl acrylate of the second emulsion polymer is a mixture of butyl acrylate with a second alkyl acrylate selected from the group consisting of 2-ethyl hexyl acrylate, isooctyl acrylate and mixtures thereof.

15. A pressure-sensitive adhesive as claimed in claim 14 in which the weight ratio of the second acrylate to butyl acrylate is about 3 to 1.

16. A pressure-sensitive adhesive emulsion as claimed in claim 11 in which the alkyl ester of acrylic acid of the first emulsion polymer is selected from the group consisting of 2-ethyl hexyl acrylate, butyl acrylate and mixtures thereof.

17. A pressure-sensitive adhesive comprising:
(a) from about 70 to about 95% by weight of total polymers of a first emulsion polymer having a glass transition temperature less than about −10° C. and a gel content greater than about 50% by weight and comprising:
   i. butyl acrylate present in a total amount of from about 95 to about 97.5% by weight of the first emulsion polymer, and
   ii. a mixture of acrylic acid and methacrylic acid present in a total amount of from about 2.5 to about 5% by weight of the first polymer and wherein the weight ratio of acrylic acid to methacrylic acid is from about 1:1 to about 1:3;

(b) an anionic surfactant system comprising, based on the weight of the anionic surfactant system and the first polymer:
   i. from about 1 to about 2% by weight of a sodium alkyl ether sulfate of the formula:

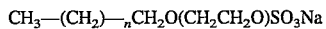

wherein N is from 6 to about 12 and x is from 20 to about 30,
   ii. from about 0.15% to about 0.3% by weight, disodium ethoxylated alkyl alcohol half ester of sulfosuccinic acid wherein the alkyl group contains from 10–12 carbon atoms, and
   iii. from about 0.1% to about 0.2% by weight, of a sodium dialkyl sulfosuccinate of the formula:

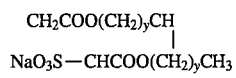

wherein each Y is independently from about 6 to about 18; and (c) from about 5 to about 30% by weight of total polymers of a second tackifying emulsion polymer formed from about 55 to 90% by weight of a blend of butyl acrylate and 2-ethyl hexyl acrylate, from 10 to about 20% by weight of a blend of methacrylate acid and acrylic acid, said first emulsion polymer and said second tackifying emulsion polymer having a glass transition temperature of about −15° to about −50° C., said second emulsion polymer formed in the presence of anionic and nonionic surfactants, and a chain transfer agent.

18. A pressure-sensitive adhesive as claimed in claim 17 in which the first emulsion polymer is present in an amount of from about 80 to about 90% by weight of the polymers and the second emulsion polymer is present in an amount of from 20 to 10% by weight of the polymers.

* * * * *

UNITED STATES PATENT AND TRADEMARK OFFICE
CERTIFICATE OF CORRECTION

PATENT NO. : 5,492,950

DATED : February 20, 1996

INVENTOR(S) : Ian Brown; Stuart A. Harris

It is certified that error appears in the above-indentified patent and that said Letters Patent is hereby corrected as shown below:

Column 5, line 56, change "following" to -- followed --.
Column 5, line 66, change "95" to -- 95% --.
Column 5, line 67, change "30" to -- 30% --.

Column 6, lines 32-34, delete
"$^1$AR150-A nonionic ethoxylated rosin acid emulsifier manufactured by Hercules.
$^2$Fe EDTA-Ferric salt of ethylenediaminetetraacetic acid."
(second occurrence)

Column 6, line 53, in Table II under the column "Grams" for
"Chain transfer agent,
n-dodecyl mercaptan (n-DDM)"
insert -- 7.2 --.

Column 6, lines 58, 59, delete
"$^3$Alipal CO436-A sulfurated ethoxylated nonylphenol containing 6 units of ethylene oxide per molecule acid manufactured and sold by Rhone Poulenc."
(second occurrence)

UNITED STATES PATENT AND TRADEMARK OFFICE
CERTIFICATE OF CORRECTION

PATENT NO. : 5,492,950
DATED : February 20, 1996
INVENTOR(S) : Ian Brown; Stuart A. Harris It is certified that error appears in the above-indentified patent and that said Letters Patent is hereby corrected as shown below:

Column 8, line 16, change "at the 70/30 and above a" to
-- at the 70/30 ratio and above, a --.
Column 8, line 62, after "ratios" insert -- which --.

Column 10, line 43, change the equation
"$CH_3-(CH_2)-_nCH_2O(C_2CH_2O)SO_3Na$" to
-- $CH_3-(CH_2)-_nCH_2O(CH_2CH_2O)SO_3Na$ --.

Column 10, line 66, after "group" insert -- of --.

Signed and Sealed this

Twenty-seventh Day of August, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,492,950
DATED : February 20, 1996
INVENTOR(S) : Ian Brown and Stuart A. Harris It is certified that error appears in the above-identified patent and that said Letters Patent is hereby corrected as shown below:

Column 1,
Line 58, replace "-10° C." with -- -10°C --.

Column 2,
Line 2, after "about 30 parts" insert a comma.
Line 3, after "20 parts" insert a comma.
Line 4, after "polymer and" insert a comma.
Line 14, after "vinyl acetate" insert a comma.
Line 17, replace "agent preferably n-dodecyl mercaptan and" with -- agent—preferably n-dodecyl mercaptan—and --.
Lines 42-45, replace "The emulsifier acrylic pressure sensitive adhesives which do not give good adhesion to nonpolar surfaces such as polyolefins and other difficult-to-bond surfaces such as recycled corrugated cardboard." with -- The emulsion acrylic pressure-sensitive adhesives give good adhesion to polar surfaces, such as stainless steel; nonpolar surfaces, such as polyolefins; and difficult-to-bond-to surfaces, such as recycled cardboard.--.
Line 58, replace "component is a one" with -- component is one --.

Column 3,
Line 1, replace "polymer are" with -- polymer is --.
Line 16, replace "100° C." with -- 100°C --.
Line 20, the equation should read:

$$-- \text{Percent insoluble} = \left[1 - \left(\frac{b-c}{a}\right)\right] \times 100 = \% \text{ gel } --$$

Line 29, replace "-10° C." with -- -10°C --.
Lines 29-30, replace "-30° C." with -- -30°C --.
Line 42, replace "grit levels low." with -- low grit levels. --.
Line 47, replace "70°C. to 85°C." with -- 70°C to 85°C --
Line 49, after "the monomers" delete "being added".
Line 59, the formula should read:
-- $CH_3(CH_2)_nCH_2O(CH_2CH_2O)_xSO_3Na$ --.
Line 61, after "groups" insert a comma.
Line 62, after "about 12" insert a comma.
Line 63, after "ethoxy groups" insert a comma.

UNITED STATES PATENT AND TRADEMARK OFFICE
CERTIFICATE OF CORRECTION

PATENT NO.    : 5,492,950
DATED         : February 20, 1996
INVENTOR(S)   : Ian Brown and Stuart A. Harris It is certified that error appears in the above-identified patent and that said Letters Patent is hereby corrected as shown below:

Column 4,
Lines 1-3, the formula should read:
$$\begin{array}{c} CH_2COO(CH_2)_yCH_3 \\ | \\ NaO_3SCHCOO(CH_2)_yCH_3 \end{array}$$
Line 26, replace "Colorimetry" with -- Calorimetry --.
Lines 44-45, replace "-15° C." with -- -15°C --.
Line 58, after "combinations" delete "system".
Lines 59-60, after "butyl acrylate" insert a comma.

Column 5,
Line 4, after "methacrylic acid" delete "are".
Line 61, after "methacrylate" insert a comma.

Column 6,
Line 3, replace "nowise" with -- not --.
Line 8, after "polymerization" insert -- a --.
Line 35, replace "70° C." with -- 70°C --.
Line 38, replace "50° C." with -- 50°C --.
Line 59, replace "There is" with -- There was --.

Column 7,
Line 13, replace "50° C." with -- 50°C --.
Line 13, after "balance" insert -- was --.
Table IV, replace "60° C." with -- 60°C -- (four occurrences).

Column 8,
Line 9, after "Brown" insert -- cardboard --.
Line 13, replace "pluck" with -- pick --.
Line 15, replace "+5 ° C." with -- +5°C --.
Line 18, replace "+5 ° C." with -- +5°C --.
Line 66, replace "23° C. and +5° C." with -- 23°C and +5°C --.

UNITED STATES PATENT AND TRADEMARK OFFICE
CERTIFICATE OF CORRECTION

PATENT NO. : 5,492,950  
DATED : February 20, 1996  
INVENTOR(S) : Ian Brown and Stuart A. Harris It is certified that error appears in the above-identified patent and that said Letters Patent is hereby corrected as shown below:

Column 9,  
Line 9, replace "-10° C." with -- -10°C --.  
Line 13, replace "an amount from" with -- an amount of from --.  
Line 26, after "15% by weight" insert -- of --.  
Line 29, replace "-50° C." with -- -50°C --.  
Line 31, after "surfactants" delete the comma.  
Lines 33-34, replace "acrylic acid is of the first emulsion polymer selected" with -- acrylic acid of the first emulsion polymer is selected --  
Line 40, replace "acid of about" with -- acid of from about --.  
Line 45, replace "acid of about" with -- acid of from about --.  
Line 61, replace "weight, a" with -- weight of a --.  
Line 64, the formula should read: -- $CH_3(CH_2)_nCH_2O(CH_2CH_2O)_xSO_3Na$ --.

Column 10,  
Line 1, replace "weight, and" with -- weight of a --.  
Line 4, replace "weight of sodium" with -- weight of a sodium --.  
Lines 7-8, the formula should read: -- $CH_2COO(CH_2)_yCH_3$  
$|$  
$NaO_3SCHCOO(CH_2)_yCH_3$ --.  
Line 21, replace "methacrylic of about" with -- methacrylic acid of from about --.  
Line 25, replace "-10° C." with -- -10°C --.  
Line 43, the formula should read: -- $CH_3(CH_2)_nCH_2O(CH_2CH_2O)_xSO_3Na$ --.  
Line 46, replace "wherein N" with -- wherein n --.  
Line 47, replace "weight, disodium" with -- weight of a disodium --.  
Line 52, replace "weight, of a" with -- weight of a --.  
Lines 54-56, the formula should read: -- $CH_2COO(CH_2)_yCH_3$  
$|$  
$NaO_3SCHCOO(CH_2)_yCH_3$ --  
Line 58, replace "wherein each Y" with -- wherein each y --.  
Line 66, replace "group unsaturated carboxylic acids, and" with -- group consisting of unsaturated carboxylic acids and --.

Column 11,  
Line 2, after "15% by weight" insert -- of --.  
Line 5, replace "-50° C." with -- -50°C --.  
Line 7, after "surfactants" delete the comma.  
Line 30, replace "-10° C." with -- -10°C --.

UNITED STATES PATENT AND TRADEMARK OFFICE
CERTIFICATE OF CORRECTION

PATENT NO. : 5,492,950
DATED : February 20, 1996
INVENTOR(S) : Ian Brown and Stuart A. Harris It is certified that error appears in the above-identified patent and that said Letters Patent is hereby corrected as shown below:

<u>Column 12,</u>
Line 7, the formula should read: -- $CH_3(CH_2)_nCH_2O(CH_2CH_2O)_xSO_3Na$ --.
Line 9, replace "wherein N" with -- wherein n --.
Lines 11-12, replace "weight, disodium" with -- weight of a disodium --.
Line 15, replace "weight, of a" with -- weight of a --.
Lines 18-20, the formula should read: -- $CH_2COO(CH_2)_yCH_3$
$|$
$NaO_3SCHCOO(CH_2)_yCH_3$ --.
Line 22, replace "wherein each Y" with -- wherein each y --.
Line 31, replace "-50° C." with -- -50°C --.
Line 33, replace "surfactants, and" with -- surfactants and --.

Signed and Sealed this

Tenth Day of September, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO.   : 5,492,950
DATED        : February 20, 1996
INVENTOR(S)  : Ian Brown et al.

It is certified that error appears in the above-identified patent and that said Letters Patent is hereby corrected as shown below:

Column 9,
Lines 23-24, replace "group unsaturated carboxylic acids, and" with -- group consisting of unsaturated carboxylic acids and --

Signed and Sealed this

Twenty-sixth Day of November, 2002

*Attest:*

JAMES E. ROGAN
*Attesting Officer*        *Director of the United States Patent and Trademark Office*